(12) United States Patent
Jemiolo et al.

(10) Patent No.: US 9,948,750 B2
(45) Date of Patent: *Apr. 17, 2018

(54) TAILORING CONTENT TO BE DELIVERED TO MOBILE DEVICE BASED UPON FEATURES OF MOBILE DEVICE

(71) Applicant: International Business Machines Corporation, Armonk, NY (US)

(72) Inventors: Daniel Jemiolo, Cary, NC (US); Todd E. Kaplinger, Raleigh, NC (US); Christopher C. Mitchell, Raleigh, NC (US); Gregory L. Truty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/212,510

(22) Filed: Jul. 18, 2016

(65) Prior Publication Data

US 2016/0330294 A1 Nov. 10, 2016

Related U.S. Application Data

(63) Continuation of application No. 13/405,311, filed on Feb. 26, 2012, now Pat. No. 9,432,479, which is a (Continued)

(51) Int. Cl.
*G06F 15/167* (2006.01)
*H04L 29/08* (2006.01)
(Continued)

(52) U.S. Cl.
CPC ............ *H04L 67/34* (2013.01); *G06F 3/0484* (2013.01); *H04L 67/18* (2013.01);
(Continued)

(58) Field of Classification Search
None
See application file for complete search history.

(56) References Cited

U.S. PATENT DOCUMENTS 6,112,246 A 8/2000 Horbal et al.
6,791,586 B2 9/2004 Baker
(Continued)

OTHER PUBLICATIONS

Office Action for U.S. Appl. No. 15/212,443 dated Oct. 6, 2016, pp. 1-23.
(Continued)

*Primary Examiner* — Razu A Miah
(74) *Attorney, Agent, or Firm* — Robert A. Voigt, Jr.; Winstead, P.C.

(57) ABSTRACT

A method, system and computer program product for delivering tailored specific content to a mobile device. A shim application is provided to the mobile device by a content server after the mobile device visits the content server for the first time. The shim application detects the capabilities of the mobile device, such as the screen size, screen resolution, memory size, browser capabilities, etc. The shim application then includes such information in the header of the requests, such as a request for content, sent from the mobile device to the content server. The content server then generates the requested content in the appropriate format based on the information provided in the header. In this manner, the content server will now be able to ensure that the content provided by the content server for a particular mobile device will be appropriately displayed on the mobile device.

12 Claims, 4 Drawing Sheets

Related U.S. Application Data continuation of application No. 13/193,810, filed on Jul. 29, 2011, now Pat. No. 9,131,013.

(51) Int. Cl.
*H04N 21/2662* (2011.01)
*H04N 21/258* (2011.01)
*H04N 21/414* (2011.01)
*H04W 4/00* (2018.01)
*H04W 4/18* (2009.01)
*G06F 3/0484* (2013.01)
*H04N 21/239* (2011.01)
*H04N 21/24* (2011.01)

(52) U.S. Cl.
CPC ..... *H04N 21/2393* (2013.01); *H04N 21/2408* (2013.01); *H04N 21/25825* (2013.01); *H04N 21/2662* (2013.01); *H04N 21/41407* (2013.01); *H04W 4/001* (2013.01); *H04W 4/18* (2013.01); *H04L 29/08072* (2013.01); *H04L 29/08549* (2013.01)

(56) References Cited

U.S. PATENT DOCUMENTS

| | | | |
|---|---|---|---|
| 6,871,236 | B2 | 3/2005 | Fishman et al. |
| 7,103,668 | B1 | 9/2006 | Corley et al. |
| 7,113,776 | B2 | 9/2006 | Minear et al. |
| 7,222,306 | B2 | 5/2007 | Kaasila et al. |
| 7,284,061 | B2 | 10/2007 | Matsubayashi et al. |
| 7,603,106 | B2 * | 10/2009 | Aaltonen .......... G06F 17/30905 455/412.1 |
| 7,734,663 | B2 | 6/2010 | DeAnna et al. |
| 7,853,593 | B2 | 12/2010 | Serdy, Jr. et al. |
| 7,908,315 | B2 | 3/2011 | Parkinson |
| 7,911,966 | B2 | 3/2011 | Yoo et al. |
| 7,974,988 | B2 | 7/2011 | Nandiwada et al. |
| 7,995,994 | B2 | 8/2011 | Khetawat et al. |
| 8,081,954 | B2 | 12/2011 | Aaltonen et al. |
| 8,099,490 | B2 | 1/2012 | Deakin |
| 8,131,875 | B1 * | 3/2012 | Chen ................ H04M 1/72522 707/E17.121 |
| 8,213,333 | B2 | 7/2012 | Greel et al. |
| 8,271,889 | B1 | 9/2012 | Beckert et al. |
| 2003/0023427 | A1 | 1/2003 | Cassin et al. |
| 2003/0033377 | A1 | 2/2003 | Chatterjee et al. |
| 2003/0073440 | A1 * | 4/2003 | Mukherjee ............. H04L 29/06 455/435.1 |
| 2003/0095135 | A1 | 5/2003 | Kaasila et al. |
| 2003/0140089 | A1 | 7/2003 | Hines et al. |
| 2003/0210776 | A1 | 11/2003 | Sollee et al. |
| 2004/0016002 | A1 | 1/2004 | Handelman et al. |
| 2004/0019683 | A1 * | 1/2004 | Lee ....................... H04L 29/06 709/227 |
| 2004/0024867 | A1 * | 2/2004 | Kjellberg .......... G06F 17/30905 709/224 |
| 2004/0133657 | A1 | 7/2004 | Smith et al. |
| 2004/0143656 | A1 | 7/2004 | Okada et al. |
| 2004/0153712 | A1 | 8/2004 | Owhadi et al. |
| 2004/0203956 | A1 * | 10/2004 | Tsampalis ......... H04M 1/72547 455/466 |
| 2005/0060381 | A1 | 3/2005 | Huynh et al. |
| 2005/0078638 | A1 | 4/2005 | Xue et al. |
| 2005/0091311 | A1 | 4/2005 | Lund et al. |
| 2005/0096016 | A1 | 5/2005 | Tervo et al. |
| 2005/0125506 | A1 | 6/2005 | Luciani et al. |
| 2005/0149564 | A1 | 7/2005 | Jain et al. |
| 2005/0154787 | A1 | 7/2005 | Cochran et al. |
| 2005/0182829 | A1 * | 8/2005 | King ................... H04L 29/06 709/220 |
| 2006/0067295 | A1 | 3/2006 | Lehotsky et al. |
| 2006/0165040 | A1 | 7/2006 | Rathod et al. |
| 2006/0168101 | A1 | 7/2006 | Mikhailov et al. |
| 2006/0198359 | A1 | 9/2006 | Fok et al. |
| 2006/0274869 | A1 | 12/2006 | Morse |
| 2006/0282767 | A1 | 12/2006 | Suryanarayana et al. |
| 2007/0043848 | A1 | 2/2007 | Sing et al. |
| 2007/0183435 | A1 | 8/2007 | Kettering et al. |
| 2008/0003991 | A1 | 1/2008 | Sievers et al. |
| 2008/0016533 | A1 | 1/2008 | Rothschild |
| 2008/0119132 | A1 * | 5/2008 | Rao ........................ G06Q 30/02 455/3.04 |
| 2008/0139112 | A1 | 6/2008 | Sampath et al. |
| 2008/0147592 | A1 | 6/2008 | Nandiwada et al. |
| 2008/0147862 | A1 * | 6/2008 | Chatani ................ H04L 29/06 709/225 |
| 2008/0189360 | A1 | 8/2008 | Kiley et al. |
| 2008/0192684 | A1 | 8/2008 | Tervonen |
| 2008/0222621 | A1 | 9/2008 | Knight et al. |
| 2008/0242221 | A1 | 10/2008 | Shapiro et al. |
| 2008/0253311 | A1 | 10/2008 | Jin |
| 2008/0263139 | A1 | 10/2008 | Martin |
| 2008/0298447 | A1 | 12/2008 | Yoo et al. |
| 2008/0305775 | A1 * | 12/2008 | Aaltonen .......... G06F 17/30905 455/412.1 |
| 2008/0313210 | A1 | 12/2008 | Cooperstein et al. |
| 2009/0063267 | A1 | 3/2009 | Dubinko et al. |
| 2009/0149162 | A1 | 6/2009 | Tenny |
| 2009/0150553 | A1 | 6/2009 | Collart et al. |
| 2009/0177770 | A1 | 7/2009 | Jeong et al. |
| 2009/0203388 | A1 * | 8/2009 | Karaoguz ............. H04W 4/02 455/456.3 |
| 2009/0213771 | A1 | 8/2009 | Celentano et al. |
| 2009/0219920 | A1 | 9/2009 | Brandstatter |
| 2009/0233587 | A1 | 9/2009 | Muhonen et al. |
| 2009/0265763 | A1 | 10/2009 | Davies et al. |
| 2009/0275348 | A1 * | 11/2009 | Weinreich ............ G01S 5/0036 455/456.3 |
| 2009/0300685 | A1 * | 12/2009 | Easter .................... H04N 7/147 725/62 |
| 2010/0064324 | A1 | 3/2010 | Jenkin et al. |
| 2010/0107146 | A1 | 4/2010 | Wrighton et al. |
| 2010/0121975 | A1 | 5/2010 | Sinha et al. |
| 2010/0153583 | A1 * | 6/2010 | Harris .............. G06F 17/30905 709/246 |
| 2010/0174607 | A1 | 7/2010 | Henkin et al. |
| 2010/0191835 | A1 | 7/2010 | Mehta et al. |
| 2010/0223324 | A1 | 9/2010 | Kawai |
| 2010/0271992 | A1 | 10/2010 | Wentink et al. |
| 2010/0273462 | A1 * | 10/2010 | Thorn ...................... H04W 8/26 455/414.1 |
| 2010/0299338 | A1 | 11/2010 | Aami et al. |
| 2011/0045847 | A1 | 2/2011 | Roin et al. |
| 2011/0093340 | A1 * | 4/2011 | Kramer ................... G06Q 30/02 705/14.58 |
| 2011/0161409 | A1 | 6/2011 | Nair et al. |
| 2011/0208822 | A1 | 8/2011 | Rathod |
| 2012/0158396 | A1 | 6/2012 | Douceur et al. |
| 2012/0206259 | A1 | 8/2012 | Gassaway |
| 2013/0031198 | A1 | 1/2013 | Jemiolo et al. |
| 2013/0070655 | A1 | 3/2013 | Nishida et al. |
| 2014/0101284 | A1 * | 4/2014 | Maddimsetty ........ H04W 4/18 709/217 |
| 2014/0143087 | A1 | 5/2014 | Ahn et al. |
| 2014/0181193 | A1 * | 6/2014 | Narasimhan .......... H04L 67/306 709/204 |

OTHER PUBLICATIONS

Hyvarinen, Tuuli, "Browsing and Navigating Web Applications with Mobile Devices," University of Jyvaskyla, Master's Thesis in Information Systems Science, Dec. 14, 2004, pp. 1-115.

Fu et al., "A Framework for Device Capability on Demand and Virtual Device User Experience," IBM Journal Research and Development, vol. 48, No. 5/6, Sep./Nov. 2004, pp. 635-648.

Mahmoud et al., "Toward a Framework for the Discovery and Acquisition of Mobile Applications," ICMB-GMR 9th Inter. Conf. on Jun. 13-15, 2010, pp. 58-65.

(56) References Cited

OTHER PUBLICATIONS

Cheng et al., "A Novel Design of Behavioral Analysis Capability in Mobile SNS," ICCTA IEEE Inter. Conf. on Oct. 16-18, 2009, pp. 907-913.
Office Action for U.S. Appl. No. 15/212,443 dated Apr. 21, 2017, pp. 1-18.
Office Action for U.S. Appl. No. 15/212,443 dated Jul. 3, 2017, pp. 1-9.

* cited by examiner

TAILORING CONTENT TO BE DELIVERED TO MOBILE DEVICE BASED UPON FEATURES OF MOBILE DEVICE

TECHNICAL FIELD

The present invention relates to mobile communications, and more particularly to tailoring the content delivered to a mobile device based upon the features of the mobile device.

BACKGROUND

In the marketplace, there are currently numerous different types of mobile devices. Mobile devices include mobile or cellular phones, smart phones, personal digital assistants ("PDAs"), palmtop computers, laptop computers and the like. These mobile devices function as wireless communication devices via a wireless communication link (GSM, GRPS, 3G, CSMA and the like) and access content over a wireless network infrastructure.

Each of these mobile devices may include different variations and features, such as web browser(s), as part of their platform. As a result, there may be difficulty in delivering content in an appropriate format to a great number of these mobile devices due to their varying features, such as varying mobile web browsers. For example, the content may not be able to be rendered appropriately on some of these mobile devices since the content provider may not be transmitting content in a format compliant with their web browsers.

The World Wide Web Consortium ("W3C") has attempted to address this problem by adopting the Composite Capabilities/Preference Profile ("CC/PP"). The CC/PP is a specification for defining capabilities and preferences of user agents, where a user agent may refer to a client application implementing a network protocol used in communications within a client-server distributed computing system. With the CC/PP, a repository is created that maps the user agent to a set of features that are supported for that mobile device. However, the repository must be constantly updated in order to ensure that the mapping is up-to-date.

An additional attempt to address the difficulty in delivering content in an appropriate format to a great number of mobile devices with varying features is to have the mobile devices contain all of the possible libraries for the various mobile browser vendors thereby ensuring that the content is rendered on the mobile device appropriately. However, requiring the mobile devices to contain all of the possible libraries for the various mobile browser vendors is burdensome. Furthermore, the libraries would constantly need to be updated to ensure they are up-to-date.

Hence, there has not been an effective solution to delivering content in an appropriate format to a great number of mobile devices due to their varying features, such as varying mobile web browsers.

SUMMARY

In one embodiment of the present invention, a method for delivering tailored specific content to a mobile device comprises providing a shim application to the mobile device, where the shim application detects capabilities of the mobile device. The method further comprises receiving a request for content, where the request comprises header information providing the capabilities of the mobile device. Additionally, the method comprises generating the content in a format compliant to the mobile device based on the header information. In addition, the method comprises transmitting, by a processor, the generated content to the mobile device.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for delivering tailored specific content to a mobile device. In one embodiment of the present invention, a shim application is provided to the mobile device by a content server after the mobile device visits the content server for the first time. The shim application detects the capabilities of the mobile device, such as the screen size, screen resolution, memory size, browser capabilities, etc. The shim application then includes such information in the header of the requests, such as a request for content, sent from the mobile device to the content server. The content server then generates the requested content in the appropriate format based on the information provided in the header. In this manner, the content server will now be able to ensure that the content provided by the content server for a particular mobile device will be appropriately displayed on the mobile device.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
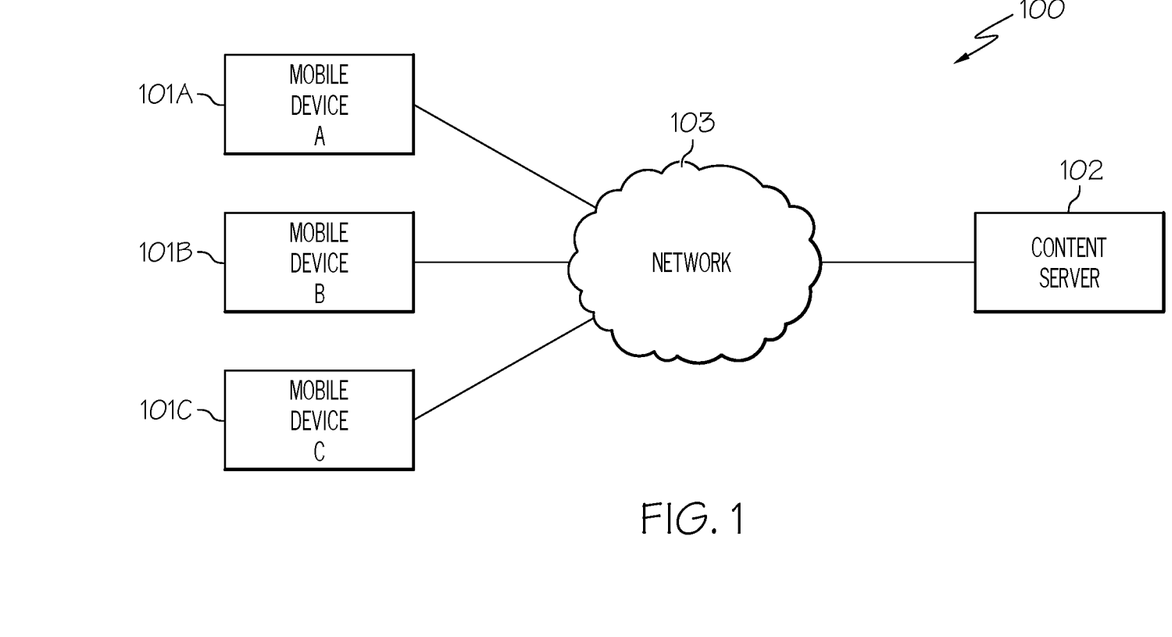
FIG. 1 illustrates an embodiment of the present invention of a network system.

Referring now to the Figures in detail, FIG. 1 illustrates a network system 100 configured in accordance with an embodiment of the present invention. Network system 100 includes mobile devices 101A-101C (identified as "Mobile Device A," "Mobile Device B," and "Mobile Device C," respectively, in FIG. 1). Mobile devices 101A-101C may collectively or individually be referred to as mobile devices 101 or mobile device 101, respectively. Mobile device 101 may be any mobile computing device, including, but not limited to, a mobile phone, a cellular phone, a smart-phone, a personal digital assistance (PDA), a gaming unit, a portable computing unit, tablet personal computer, and the like. System 100 may include any number of mobile devices 101 and the depiction of three mobile devices 101A-101C in FIG. 1 is for illustrative purposes. A description of one embodiment of the hardware configuration of mobile device 101 is provided below in connection with FIG. 2.

Mobile devices 101 are in wireless communication with a content server 102 via a network 103, which may be, for example, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Content server 102 is configured to receive and provide services and information to mobile devices 101. In particular, content server 102 is configured to receive a request for content from mobile device 101 and to ensure that the content is formatted in a format compliant for mobile device 101 based on header information provided by a shim application as discussed further below. A description of one embodiment of the hardware configuration of content server 102 is provided below in connection with FIG. 3.

While FIG. 1 illustrates a single server 102, the principles of the present invention are not so constrained. For example, content may be served from a plurality of content servers, including a content server farm, a distributed server architecture, and the like, without departing from the scope and spirit of the described embodiments.

Figure 2:
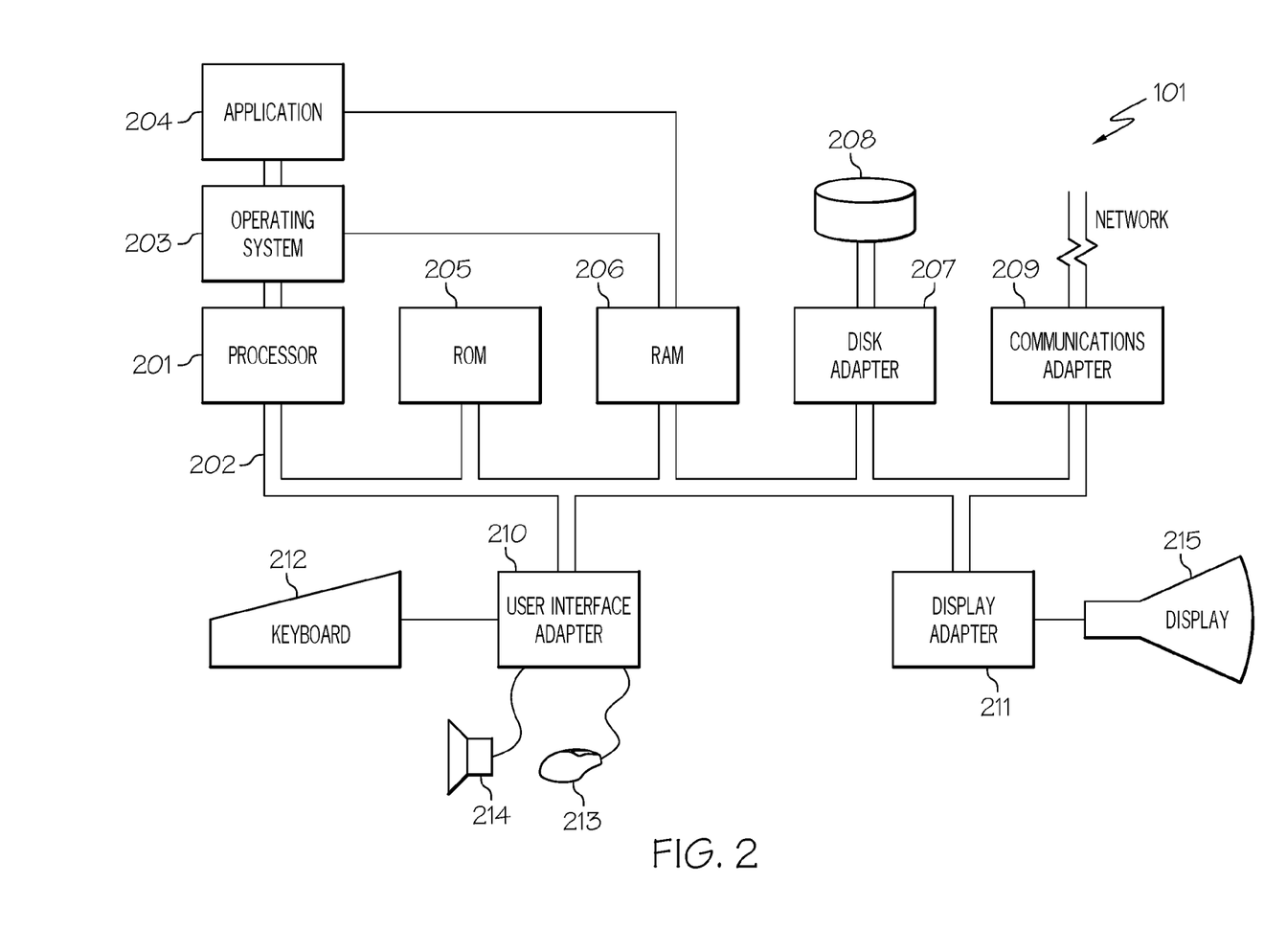
FIG. 2 illustrates a hardware configuration of a mobile device in accordance with an embodiment of the present invention.

Referring now to FIG. 2, FIG. 2 illustrates a hardware configuration of mobile device 101 which is representative of a hardware environment for practicing the present invention. Referring to FIG. 2, mobile device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a browser, an application shim provided by content server 102 (FIG. 2) used to detect the capabilities (e.g., screen size, screen resolution, memory size, browser capabilities) of mobile device 101, as discussed further below in association with FIG. 4.

Referring again to FIG. 2, read-only memory ("ROM") 205 is coupled to system bus 202 and includes a basic input/output system ("BIOS") that controls certain basic functions of mobile device 101. Random access memory ("RAM") 206 and disk adapter 207 are also coupled to system bus 202. It should be noted that software components including operating system 203 and application 204 may be loaded into RAM 206, which may be mobile device's 101 main memory for execution. Disk adapter 207 may be an integrated drive electronics ("IDE") adapter that communicates with a disk unit 208, e.g., disk drive.

Mobile device 101 may further include a communications adapter 209 coupled to bus 202. Communications adapter 209 interconnects bus 202 with an outside network (network 103) thereby enabling mobile device 101 to communicate with content server 102.

I/O devices may also be connected to mobile device 101 via a user interface adapter 210 and a display adapter 211. Keyboard 212, mouse 213 and speaker 214 may all be interconnected to bus 202 through user interface adapter 210. Data may be inputted to mobile device 101 through any of these devices. A display monitor 215 may be connected to system bus 202 by display adapter 211. In this manner, a user is capable of inputting to mobile device 101 through keyboard 212 or mouse 213 and receiving output from mobile device 101 via display 215 or speaker 214.

Figure 3:
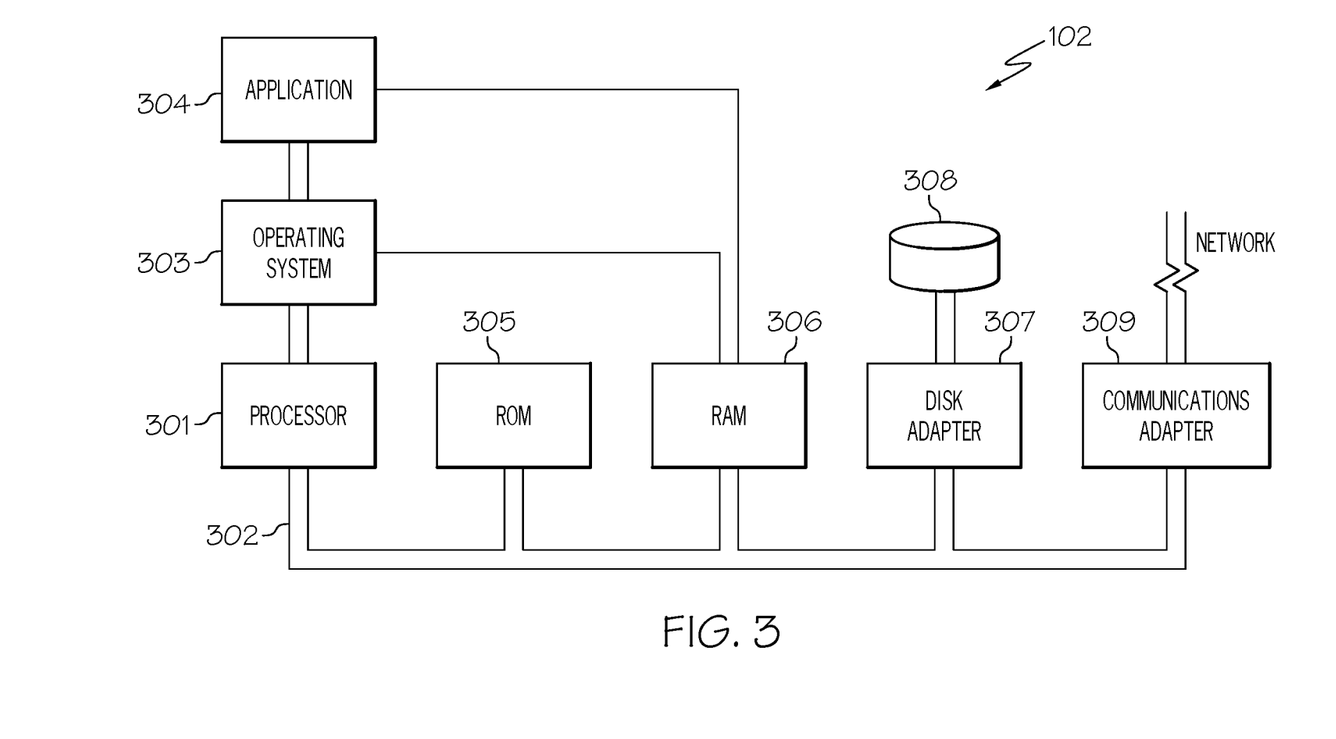
FIG. 3 illustrates a hardware configuration of a content server in accordance with an embodiment of the present invention.

As stated above, FIG. 3 illustrates a hardware configuration of a content server 102 (FIG. 1) which is representative of a hardware environment for practicing the present invention. Referring to FIG. 3, content server 102 has a processor 301 coupled to various other components by system bus 302. An operating system 303 runs on processor 301 and provides control and coordinates the functions of the various components of FIG. 3. An application 304 in accordance with the principles of the present invention runs in conjunction with operating system 303 and provides calls to operating system 303 where the calls implement the various functions or services to be performed by application 304. Application 304 may include, for example, a program for delivering tailored specific content to mobile device 101, as discussed further below in association with FIG. 4.

Referring again to FIG. 3, read-only memory ("ROM") 305 is coupled to system bus 302 and includes a basic input/output system ("BIOS") that controls certain basic functions of content server 102. Random access memory ("RAM") 306 and disk adapter 307 are also coupled to system bus 302. It should be noted that software components including operating system 303 and application 304 may be loaded into RAM 306, which may be content server's 102 main memory for execution. Disk adapter 307 may be an integrated drive electronics ("IDE") adapter that communicates with a disk unit 308, e.g., disk drive. It is noted that the program for delivering tailored specific content to mobile device 101, as discussed further below in association with FIG. 4, may reside in disk unit 308 or in application 304.

Content server 102 may further include a communications adapter 309 coupled to bus 302. Communications adapter 309 interconnects bus 302 with an outside network (network 103) thereby allowing content server 102 to communicate with mobile devices 101.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, mobile devices may include different variations and features, such as web browser(s), as part of their platform. As a result, there may be difficulty in delivering content in an appropriate format to a great number of these mobile devices due to their varying features, such as varying mobile web browsers. For example, the content may not be able to be rendered appropriately on some of these mobile devices since the content provider may not be transmitting content in a format compliant with their web browsers. Currently, there has not been an effective solution to delivering content in an appropriate format to a great number of mobile devices due to their varying features, such as varying mobile web browsers.

Figure 4:
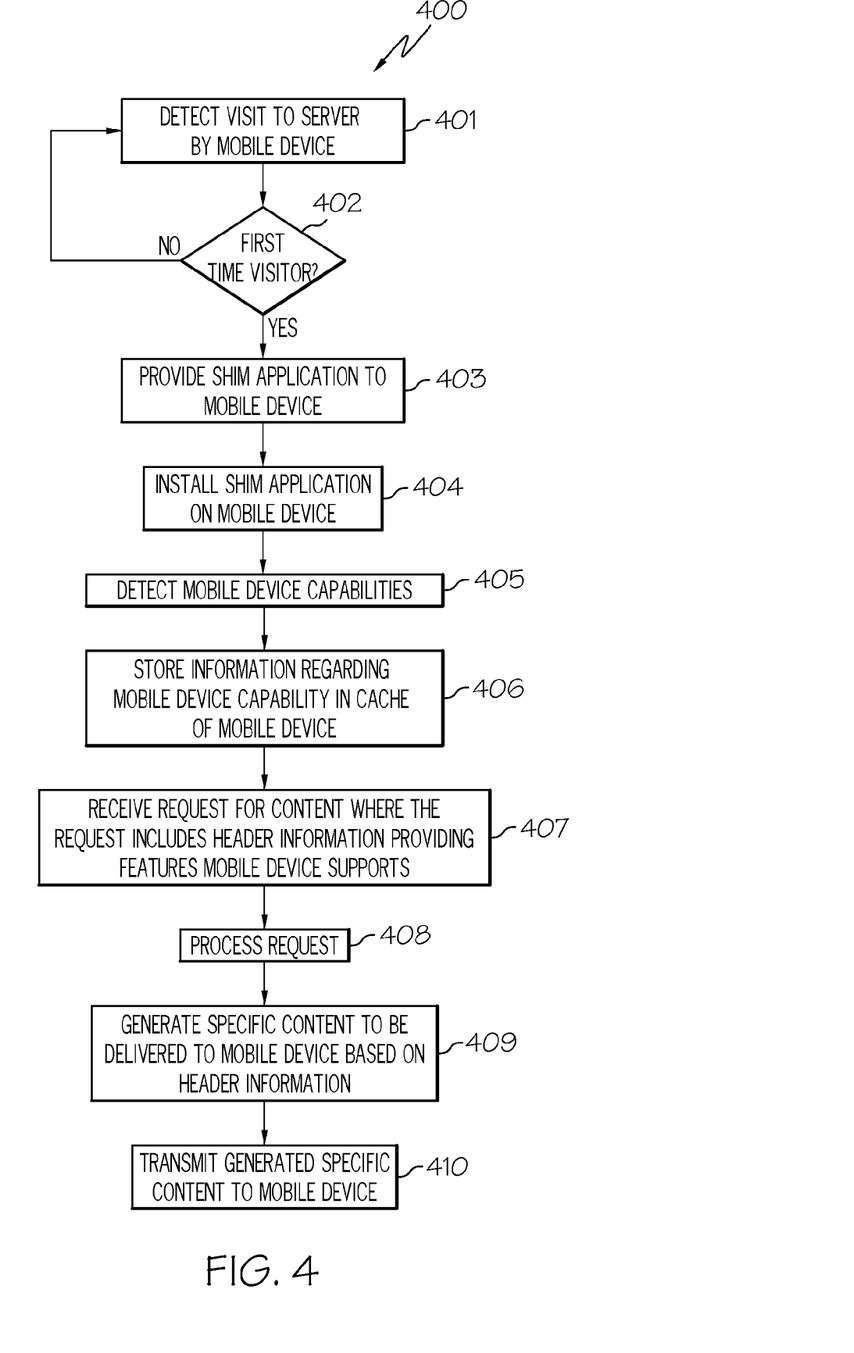
FIG. 4 is a flowchart of a method for delivering tailored specific content to a mobile device in accordance with an embodiment of the present invention.

The principles of the present invention provide an improved technique for delivering content in an appropriate format to various mobile devices with varying platforms by having the content server deliver specifically tailored content to each mobile device as discussed below in connection with FIG. 4. FIG. 4 is a flowchart of a method for delivering tailored specific content to a mobile device.

As stated above, FIG. 4 is flowchart of a method for delivering tailored specific content to a mobile device 101 (FIGS. 1 and 2) in accordance with an embodiment of the present invention.

Referring to FIG. 4, in conjunction with FIGS. 1-3, in step 401, content server 102 detects a visit to server 102 by mobile device 101.

In step 402, a determination is made by server 102 as to whether the visit by mobile device 101 is a first time visit. If the visit is not a first time visit, then content sever 102 continues to monitor a visit by a subsequent mobile device 101 in step 401.

If, however, content server 102 detects a first time visit by mobile device 101, then, in step 403, content server 102 provides a shim application to mobile device 101. A shim application refers to a small library which transparently intercepts an application programming interface of mobile device 101, changes the parameters passed, handles the operation itself or redirects the operation elsewhere. "Providing the shim application," as used herein, includes any means for the shim application to be provided to mobile device 101, including having content server 102 directly transmit the shim application to mobile device 101 as well as having content server 102 transmit a link to a website to download the shim application. In one embodiment, the shim application will be specific to mobile device 101 and will act as a client side proxy application. In one embodiment, the shim application will be configured as part of the installation.

In step 404, the user of mobile device 101 installs the shim application on mobile device 101. Once installed, in step 405, the shim application will detect the capabilities of mobile device 101. For example, the shim application can detect one or more of the following capabilities: screen size, screen resolution, memory size, browser capabilities, and the like. This list is not intended to be limiting but to provide examples of information that may be used to determine the capabilities of mobile device 101 so that content server 102 appropriately formats the content to be appropriately displayed on mobile device 101. Embodiments of the present invention cover any such information regarding the capabilities of mobile device 101 that may be used by content server 102 to appropriately format the content to be appropriately displayed on mobile device 101.

In step 406, the information regarding the capabilities of mobile device 101 detected by the shim application is stored in a cache (not shown in FIG. 2) of mobile device 101. The cache may be located internal within processor 201 or located external to processor 201. The cache may be any type of cache (e.g., physically indexed, physically tagged; virtually indexed, virtually tagged; virtually indexed, physically tagged).

In step 407, content server 102 receives a request for content from mobile device 101, where the request includes header information that provides content server 102 with the features or capabilities mobile device 101 supports, such as the capabilities detected in step 405. In one embodiment, the shim application adds the header information to the beginning of the data (i.e., request) being transmitted to content server 102, where the header information is obtained from the cache of mobile device 101.

In step 408, content server 102 processes the request. In step 409, content server 102 generates specific content to be delivered to mobile device 101 based on the received header information thereby ensuring that the content is formatted in a manner so that it will be appropriately displayed on mobile device 101. By content server 102 receiving information regarding the capabilities of mobile device 101 via the header information, content server 102 will now be able to ensure that the content provided by content server 102 for a particular mobile device 101 will be appropriately displayed on mobile device 101.

In step 410, content server 102 transmits the content generated in step 409 to mobile device 101.

In some implementations, method 400 may include other and/or additional steps that, for clarity, are not depicted. Further, in some implementations, method 400 may be executed in a different order presented and that the order presented in the discussion of FIG. 4 is illustrative. Additionally, in some implementations, certain steps in method 400 may be executed in a substantially simultaneous manner or may be omitted.

An example of a program using the principles of the present invention includes a program for generating charts and gauges which can be generated either on the client-side or on the sever-side. The determination as to whether the program generates the charts and gauges on either the client-side or on the server-side can be determined based on the memory capabilities of the mobile device, which is obtained from the shim application.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for delivering tailored specific content to a mobile device, the computer program product comprising a computer readable storage medium having program code embodied therewith, the program code comprising the programming instructions for:
   monitoring accesses on a server for access operation(s) performed by a mobile device to determine a first access operation by the mobile device;
   responsive to detecting the first access operation, directing a user through a user interface to load an application for the mobile device; and
   receiving a mobile device capability data set indicative of capabilities of the mobile device that have been determined based upon automatically detecting of capabilities of the mobile device by the application.

2. The computer program product as recited in claim 1, wherein the program code further comprises the programming instructions for:
   providing, by the server and to the mobile device through a wireless communication network, a user interface data set for implementing the user interface on the mobile device.

3. The computer program product as recited in claim 1, wherein the application includes program instructions programmed to:
   store the mobile device capability data set in a cache of the mobile device; and
   communicate, from the mobile device, to the server and through a wireless communication network, the mobile device capability data set.

4. The computer program product as recited in claim 1, wherein the program code further comprises the programming instructions for:
   receiving, by the server, from the mobile device and through a communications network, a first request;
   determining, by the server, a first response to the first request, with the first response being based, at least in part, upon the mobile device capabilities indicated by the mobile device capability data set.

5. The computer program product as recited in claim 1, wherein the mobile device capability data set includes at least one of the following types of capability information: geolocation and screen size.

6. The computer program product as recited in claim 1, wherein the mobile device capability data set includes both of the following types of capability information: geolocation and screen size.

7. A server, comprising:
a memory unit for storing a computer program for delivering tailored specific content to a mobile device; and
a processor coupled to the memory unit, wherein the processor is configured to execute the program instructions of the computer program comprising:
monitoring accesses for access operation(s) performed by a mobile device to determine a first access operation by the mobile device;
responsive to detecting the first access operation, directing a user through a user interface to load an application for the mobile device; and
receiving a mobile device capability data set indicative of capabilities of the mobile device that have been determined based upon automatically detecting of capabilities of the mobile device by the application.

8. The server as recited in claim 7, wherein the program instructions of the computer program further comprise:
providing, by the server and to the mobile device through a wireless communication network, a user interface data set for implementing the user interface on the mobile device.

9. The server as recited in claim 7, wherein the application includes program instructions programmed to:
store the mobile device capability data set in a cache of the mobile device; and
communicate, from the mobile device, to the server and through a wireless communication network, the mobile device capability data set.

10. The server as recited in claim 7, wherein the program instructions of the computer program further comprise:
receiving from the mobile device and through a communications network, a first request;
determining a first response to the first request, with the first response being based, at least in part, upon the mobile device capabilities indicated by the mobile device capability data set.

11. The server as recited in claim 7, wherein the mobile device capability data set includes at least one of the following types of capability information: geolocation and screen size.

12. The server as recited in claim 7, wherein the mobile device capability data set includes both of the following types of capability information: geolocation and screen size.

* * * * *